May 19, 1931. J. H. ROBERTS 1,805,599
COTTON CHOPPING ATTACHMENT FOR CULTIVATORS
Filed March 8, 1930
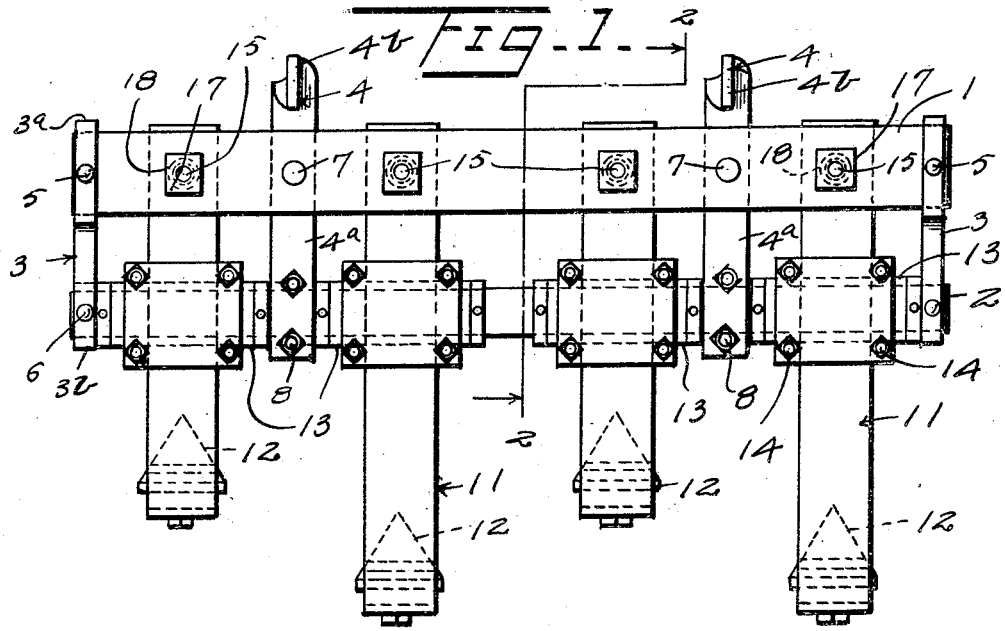
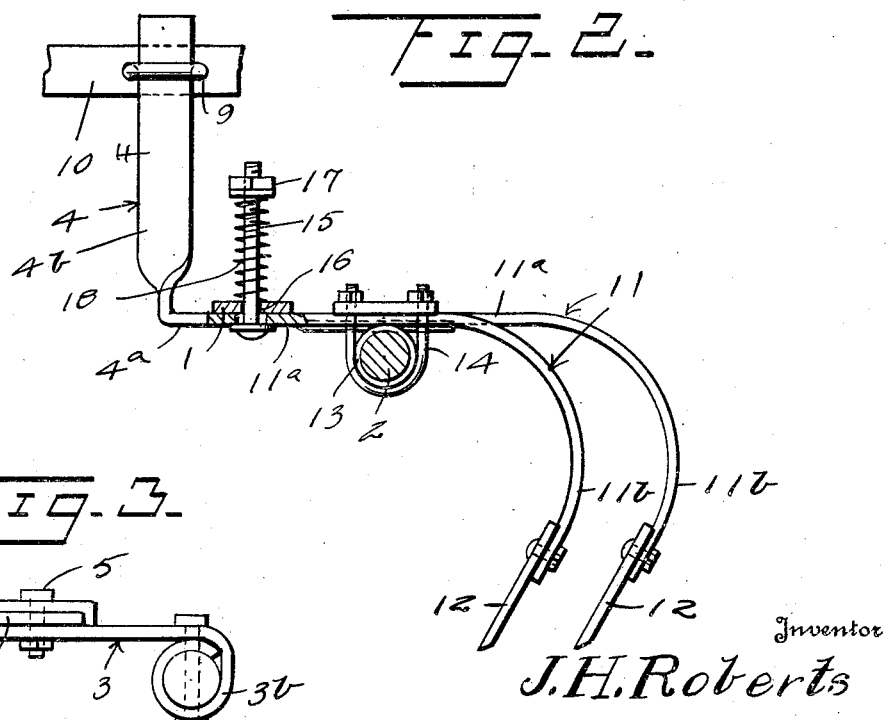
Inventor
J. H. Roberts
By Watson E. Coleman
Attorney Patented May 19, 1931

1,805,599

UNITED STATES PATENT OFFICE

JOHN H. ROBERTS, OF HATFIELD, ARKANSAS

COTTON CHOPPING ATTACHMENT FOR CULTIVATORS

Application filed March 8, 1930. Serial No. 434,285.

This invention relates to cotton choppers, and more particularly to a cotton chopping attachment for cultivators.

The invention has for one of its objects to provide a novel, simple and highly efficient cotton chopping attachment which shall be adapted to be readily connected to a riding or walking cultivator.

To attain the foregoing and other objects, the nature of which will appear as the description proceeds, the invention comprehends the provision of a cotton chopping attachment which shall embody a frame, means adapted to secure the frame to a cultivator, standards equipped with chopping hoes and connected to the frame for independent pivotal movement thereon, and means yieldingly holding the standards against pivotal movement with respect to the frame.

The invention further comprehends the provision of a cotton chopping attachment wherein the frame shall embody a bar and a shaft, wherein the means for connecting the frame to a cultivator shall embody brackets having horizontal arms fixed to the bar and shaft and vertical arms adapted to be secured to the cultivator, and wherein the hoes standards shall be pivotally mounted upon the shaft with their front ends arranged beneath the bar, and wherein the means for yieldingly holding the standards against pivoted movement shall embody rods carried by the standards and passing freely through the bar and springs bearing on the bar and against the rod.

The invention is hereinafter fully described and claimed, and illustrated in the accompanying drawings, wherein:

Figure 1 is a top plan view of the cotton chopping attachment;

Figure 2 is a sectional view taken on the vertical planes indicated by the line 2—2 of Figure 1, and Figure 3 is a view in end elevation of the frame of the cotton chopping attachment.

The cotton chopping attachment comprises a bar 1 and a shaft 2 of which the latter is located in rear of the former. The bar 1 and shaft 2 are connected at their ends by links 3 and the bar, shaft and links provide a frame of elongated rectangular contour in plan and adapted to be connected to a cultivator by brackets 4. The links 3 are provided at their front ends with rectangular loops 3ª for the reception of the ends of the bar 1, and are provided at their rear ends with circular loops 3ᵇ for the reception of the ends of the shaft 2. Bolts 5 passing through the bar 1 and loops 3ª and bolts 6 passing through the shaft 2 and loops 3ᵇ, secure the bar, shaft and links 3ᵇ in assembled relation, the bolts 6 holding the shaft against rotation. The brackets 4 have horizontal arms 4ª which rest upon the bar 1, shaft 2 and are secured to the bar by bolts 7 and to the shaft by clamps 8. The brackets 4 also have vertical arms 4ª adapted to be secured by bolts 9 to any suitable parts of a cultivator. The brackets 4 are arranged between the links 3 and the transverse center of the frame, and their horizontal arms 4ª strengthen and reinforce the frame at the points where it is connected to the cultivator. The brackets 4 may be secured to those parts of a cultivator to which the gang bars are secured, one of such parts being diagrammatically shown and designated 10.

Standards 11 having straight portions 11ª and curved portions 11ᵇ, are secured to the frame through the medium of their straight portions which have their front ends arranged at the under side of the bar 1 and rest at points intermediate their ends upon the shaft 2. The standard portions 11ᵇ extend downwardly and forwardly and are provided at their lower ends with blades 12. The attachment may be provided with any desired or required number of the blade carrying standards 11. The standard portions 11ª are of such length as to arrange the blades 12 in front and rear rows.

The standards 11 are rockably supported upon the shaft 2 by bearing sleeves 13. The standard portions 11ª rest upon the bearing sleeve 13, and are secured thereto by U-bolts 14. As the front ends of the standards 11 contact with the under side of the bar 1, the rocking movement of the standards is limited to a direction which will permit the blades 12 to move upwardly and rearwardly and the blades will move in this direction when they encounter stones or the like obstructions. The standards 11 are provided at their front ends with upwardly extending rods 15 which pass freely through openings 16 in the bar 1 and are provided at their upper ends with nuts 17. Springs 18 are mounted on the bolts 15 between the bar 1 and nuts 17, and serve to yieldingly hold the standards 11 against rocking movement.

The attachment may be readily connected through the medium of brackets 4 to a riding or walking cultivator, and will, when in use, chop or cut down every other stand of cotton. It may also be used for the purpose of plowing in oats, plowing level land and tearing down ridges. It is strong and durable, and may be manufactured and sold at a comparatively low cost.

While I have described the principle of the invention, together with the structure which I now consider the preferred embodiment thereof, it is to be understood that the structure shown is merely illustrative and that such changes may be made, when desired, as fall within the scope of the invention as claimed.

I claim:—

1. A cultivator attachment of the character set forth, comprising a frame embodying a front bar and a rear shaft, attaching brackets secured to the frame, standards having straight front portions and curved rear portions, the straight standard portions extending across the shaft and having their front ends positioned in contact with the rear side of the bar and the rear portions of the standard extending downwardly and forwardly, blades secured to the lower ends and the rear portions of the standards, means rockably connecting the standards to the shaft, and means cooperative with the bar and standards to yieldingly hold them against rocking movement.

2. A cultivator attachment of the character set forth, comprising a frame embodying a front bar and a rear shaft, bearing sleeves rotatably mounted on the shaft, standards having straight front portions and curved rear portions, the front standard portions resting upon the sleeves and having their front ends arranged in contact with the under side of the bar and the rear standard portions extending downwardly and rearwardly, blades secured to the lower end of the rear standard portions, means securing the front standard portions to the bearing sleeves, bolts secured to the front ends of the front standard portions and extending upwardly through the bar and provided at their upper ends with nuts, and coil springs arranged upon the bolts between the bar and nuts.

3. A cultivator attachment of the character set forth, comprising a bar provided with openings, a shaft located rearwardly of the bar, links connecting the terminals of the bar and shaft, brackets having vertical and horizontal portions and having their horizontal portions secured to the bar and shaft, bearing sleeves rotatably mounted upon the shaft, standards having straight front portions and curved rear portions, the standard front portions resting upon the bearing sleeves and having their front ends contacting with the lower side of the bar and the standard rear portions extending downwardly and forwardly, means securing the front standard portions to the bearing sleeves, bolts secured to the front ends of the front standard portions and extending upwardly through the openings in the bar and provided at their upper ends with nuts, coil springs surrounding the bolts between the bar and nuts, and plates secured to the lower ends of the rear standard portions.

In testimony whereof I hereunto affix my signature.

JOHN H. ROBERTS.